(12) United States Patent
Ishikura (10) Patent No.: US 11,909,936 B2
(45) Date of Patent: Feb. 20, 2024

(54) IMAGE FORMING APPARATUS STORING SCAN DATA IN EXTERNAL MEMORY, NON-TRANSITORY RECORDING MEDIUM STORING CONTROL PROGRAM, AND CONTROL METHOD

(71) Applicant: SHARP KABUSHIKI KAISHA, Sakai (JP)

(72) Inventor: Hiroyuki Ishikura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/117,106

(22) Filed: Mar. 3, 2023

(65) Prior Publication Data

US 2023/0308579 A1 Sep. 28, 2023

(30) Foreign Application Priority Data

Mar. 23, 2022 (JP) ................. 2022-047227

(51) Int. Cl.
  *H04N 1/21* (2006.01)
  *H04N 1/32* (2006.01)
(52) U.S. Cl.
  CPC ......... *H04N 1/2158* (2013.01); *H04N 1/2195* (2013.01); *H04N 1/32106* (2013.01); *H04N 2201/214* (2013.01); *H04N 2201/3221* (2013.01)
(58) Field of Classification Search
  CPC ............... H04N 1/2158; H04N 1/2195; H04N 1/32106; H04N 2201/3221
  See application file for complete search history.

(56) References Cited

U.S. PATENT DOCUMENTS

| 2003/0184828 | A1* | 10/2003 | Morisaki | H04N 1/2158 |
| | | | | 358/523 |
| 2006/0262351 | A1* | 11/2006 | Kim | H04N 1/2104 |
| | | | | 358/1.15 |
| 2006/0268310 | A1* | 11/2006 | Tamai | H04N 1/00915 |
| | | | | 358/1.14 |
| 2007/0024884 | A1* | 2/2007 | Yano | H04N 1/2158 |
| | | | | 358/1.15 |
| 2011/0066862 | A1 | 3/2011 | Sugimoto | |
| 2021/0029266 | A1* | 1/2021 | Sugiyama | H04N 1/32448 |
| 2022/0214838 | A1* | 7/2022 | Urakawa | G06F 3/1204 |
| 2022/0214839 | A1* | 7/2022 | Hori | H04N 1/00962 |

FOREIGN PATENT DOCUMENTS

JP 2011-066470 A 3/2011

* cited by examiner

*Primary Examiner* — Nicholas Pachol
(74) *Attorney, Agent, or Firm* — ScienBiziP, P.C.

(57) ABSTRACT

An image forming apparatus records identification information of an external memory and identification information of a scan job as a log when the external memory is attached to start the scan job. When the external memory is removed in the middle of the scan job, scan data is temporarily saved together with the identification information of the job. When the removed external memory is attached, for example, in a ready state, log data is referred to determine whether the external memory is that removed in the middle of the job and whether the scan data associated with the external memory is saved. When it is determined that the scan data is saved, the scan data is saved in the external memory.

6 Claims, 8 Drawing Sheets

IN-PROGRESS
NOTIFICATION SCREEN  64

66

NONE OF JOBS IS COMPLETED.

POST-PROCESSING
(FOREGROUND) SCREEN  70

72

POST-PROCESSING SCAN DATA IN
FOREGROUND
(###-th PAGE)

JOB COMPLETION NOTIFICATION SCREEN 76

IMAGE FORMING APPARATUS STORING SCAN DATA IN EXTERNAL MEMORY, NON-TRANSITORY RECORDING MEDIUM STORING CONTROL PROGRAM, AND CONTROL METHOD

BACKGROUND OF THE INVENTION

Field of the Invention

The disclosure relates to an image forming apparatus, and in particular to an image forming apparatus, a non-transitory recording medium storing a control program, and a control method, in which an external memory such as a USB flash drive can be detachably mounted.

Description of the Background Art

A technology is disclosed to execute a process (ScanToUSB) to directly save image data scanned by a scanner (image reading device) to an external memory such as a USB flash drive.

Such a process sometimes takes a long time to execute, but in such a case, if the USB flash drive is removed in the middle of the process, the image data obtained by the scan cannot be written to the USB flash drive, so by writing the identifier of the image data in the USB flash drive, it is possible to continue writing the image data when the USB flash drive is reconnected.

When the USB flash drive is removed in the middle of the process and the identification information of the image data is lost for some reason, it becomes impossible to write the image data to the USB flash drive.

Therefore, a primary object of the disclosure is to provide a novel image forming apparatus, a non-transitory recording medium storing a control program, and a control method.

Another object of the disclosure is to provide an image forming apparatus, a non-transitory recording medium storing a control program, and a control method that can reliably write scan data to an external memory even if the external memory is removed in the middle of the writing.

SUMMARY OF THE INVENTION

In order to solve the above problem, the disclosure has adopted the following structure. Note that reference signs and supplementary explanations in parentheses and the like indicate correspondence with embodiments described to help understanding of the present disclosure and do not limit the present disclosure in any way.

According to a first aspect, an image forming apparatus executes a scan job to save scan data scanned by a scanner in an external memory and includes: the scanner that scans a document; an external memory port to which the external memory is removably attached; a log data storage that stores identification information of the external memory attached to the external memory port and identification information of the scan job as a log by associating the identification information of the external memory with the identification information of the scan job; a first determiner that determines whether the external memory is removed from the external memory port during execution of the scan job; a selector that allows a user to select whether to continue or cancel the scan job when the first determiner determines that the external memory has been removed; a temporary storage that temporarily stores the scan data together with the identification information of the scan job when continuation of the scan job is selected by the selector; a second determiner that determines whether the scan data associated with the external memory is saved in the temporary storage when the external memory is attached to the external memory port; and a first storage that stores, in the external memory, the scan data stored in the temporary storage when the second determiner determines that the associated scan data is saved in the temporary storage.

In the first aspect, the image forming apparatus (10: reference sign exemplifying the corresponding part in the example, but not as a limitation, and the same shall apply hereinafter) includes the scanner (12) that scans a document and an external memory port (16) to which an external memory (18) is detachably attached, and executes a scan job such as ScanToUSB to save scan data obtained by scanning the document with the scanner in the external memory (18). At the start of the scan job, a log data storage (30, S1) stores identification information of the external memory (18) attached to the external memory port (16) and identification information of the scan job as a log in a log data area (48*d*) in association with each other. The first determiner (30, S5) determines whether the external memory (18) is removed from the external memory port (16) during execution of the scan job, and when the first determiner determines that the external memory is removed, the selector (30, S7, 50) allows a user to select whether to continue or cancel the scan job. For example, when a user operates a continue button (54) on a continuation confirmation screen (50), the selector (30, S7, 50) selects continuation of the scan job. When continuation is selected, the temporary storage (30, S19, 48*c*) saves the scan data together with identification information of the scan job. Subsequently, when the previously removed external memory (18) is attached to the external memory port (16), for example, in a ready state of the image forming apparatus, the second determiner (30, S45) determines whether the scan data associated with the external memory is saved in the temporary storage. When the second determiner determines that the scan data associated with the temporary storage is saved, the first storage (30, S47) stores the scan data saved in the temporary storage in the external memory.

According to the first aspect, the identification information of the external memory is stored in association with the identification information of the scan job so that even if the external memory is removed in the middle of a job, scan data can be reliably written to the external memory by reattaching the same external memory.

A second aspect provides the image forming apparatus according to the first aspect in which the scan job ends when the scan job is cancelled by the selector.

In the second aspect, when a user operates a cancel button (56) on the continuation confirmation screen (50), the selector (30, S7, 50) selects cancellation of the scan job, and the scan job ends at this time.

According to the second aspect, the user can remove the external memory and cancel the scan job.

A third aspect provides the image forming apparatus according to the first or second aspect, in which the image forming apparatus further includes a second storage that saves the scan data in the external memory when the first determiner does not determine that the external memory has been removed.

In the third aspect, the second storage (30, S33) saves the scan data in the external memory (18) when the first determiner (30, S5) did not determine that the external memory (18) was removed.

According to the third aspect, when the external memory is not removed, the scan data is saved in the external memory as it is.

The fourth aspect provides the image forming apparatus according to any one of first to third aspects in which the image forming apparatus further includes a third determiner that determines whether the removed external memory has been reattached to the external memory port before the scan job is completed; and a third storage that saves the scan data in the reattached external memory when the third determiner determines that the external memory has been reattached.

In the fourth aspect, the third determiner (30, S15, S25) determines whether the removed external memory (18) has been reattached to the external memory port (16) before the scan job is completed, and when the third determiner (30, S15, S25) determines that the external memory has been reattached, the third storage (30, S29) save the scan data to the reattached external memory.

According to the fourth aspect, even if the external memory is once removed, if it is reattached before the end of the scan job, the scan data can be saved in the external memory as is.

A fifth aspect provides a non-transitory recording medium storing a control program of an image forming apparatus that executes a scan job to save scan data scanned by a scanner in an external memory, the apparatus including the scanner that scans a document and an external memory port to which the external memory is removably attached, the control program causing a computer of the image forming apparatus to function as: a log data storage that stores identification information of the external memory attached to the external memory port and identification information of the scan job as a log by associating the identification information of the external memory with the identification information of the scan job; a first determiner that determines whether the external memory is removed from the external memory port during execution of the scan job; a selector that allows a user to select whether to continue or cancel the scan job when the first determiner determines that the external memory has been removed; a temporary storage that temporarily saves the scan data together with the identification information of the scan job when continuation of the scan job is selected by the selector; a second determiner that determines whether the scan data associated with the external memory is saved in the temporary storage when the external memory is attached to the external memory port; and a storage that stores, in the external memory, the scan data saved in the temporary storage when the second determiner determines that the associated scan data is saved in the temporary storage.

A sixth aspect provides a control method of an image forming apparatus that executes a scan job to save scan data scanned by a scanner in an external memory, the apparatus including the scanner that scans a document and an external memory port to which the external memory is removably attached, the method including: (a) storing identification information of the external memory attached to the external memory port and identification information of the scan job as a log by associating the identification information of the external memory with the identification information of the scan job; (b) determining whether the external memory is removed from the external memory port during execution of the scan job; (c) allowing a user to select whether to continue or cancel the scan job when step (b) determines that the external memory has been removed; (d) temporarily saving the scan data together with the identification information of the scan job when continuation of the scan job is selected in step (c); (e) determining whether the scan data associated with the external memory is saved in step (d) when the external memory is attached to the external memory port; and (f) saving the scan data saved in step (d) in the external memory when step (e) determined that the associated scan data has been saved in step (d).

According to the fifth and sixth aspects, the same advantage as that of the first aspect can be expected.

According to the disclosure, the identification information of the external memory is stored in the image forming apparatus in association with the identification information of the scan job so that even if the external memory is removed in the middle of a job, scan data can be reliably written to the external memory.

DESCRIPTION OF THE PREFERRED EMBODIMENTS

Figure 1:
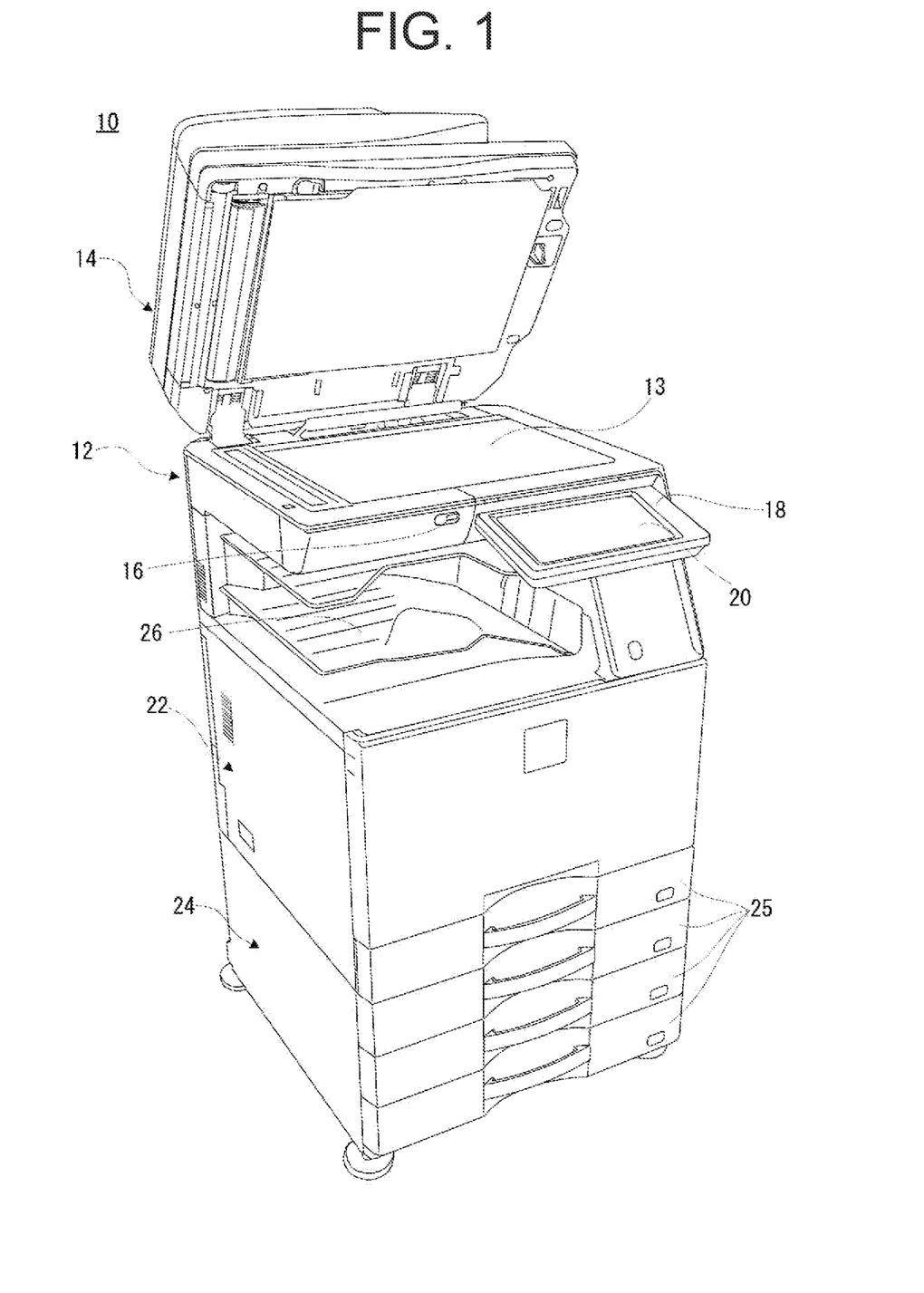
FIG. 1 is an illustrative diagram of an image forming apparatus according to an embodiment of the disclosure.

With reference to FIG. 1, an image forming apparatus 10, which is one embodiment of the disclosure, is a multifunction peripheral (MFP) as one example, and is provided with multiple functions such as a copy function, an image scanner function, a printer function, and a fax function. However, the disclosure can be applied to an image forming apparatus that can scan a document and output scan image data.

An image reader 12 as one example of an image reader (scanner) is provided at an upper part of the image forming apparatus 10. This image reader or scanner 12 reads images of a document (not illustrated) to output image data of the document. The image reader 12 includes a transparent document table 13 on which a document is placed. The document placed on the document table 13 is held in place by a document table cover 14. The document table cover 14 is provided above the image reader 12 so as to open and close, for example, using a hinge on one side of the rear side of the document table 13.

An operation acceptor 19 is provided above the image forming apparatus 10 in front of the image reader 12 together with an external memory port 16 to which an external memory 18 (FIG. 2) such as a USB flash drive can be attached or detached. For example, a display (touch display) 20 with a touch panel is provided on an operation surface of the operation acceptor 19.

An image former 22 as an example of an image former is provided below the image reader 12. The image former 22 prints an image, e.g., a document image, processed by an image processor 28 (FIG. 2) on a sheet serving as a recording medium. The image forming process is executed through, for example, a known electrophotographic method. Therefore, the image former 22 includes components for image forming such as photoconductor drums, as is already well known.

A sheet feeder 24 is provided as an example of a sheet feeder below the image former 22. The sheet feeder 24 has four sheet feed cassettes 25 in the present embodiment. Each of the sheet feed cassettes 25 houses sheets of a predetermined size in a predetermined orientation. Although not illustrated, a manual feed tray is provided on a right side surface of the image forming apparatus 10. The sheet feeder 24 applies either one of the sheet feed cassettes 25 or the manual feed tray as a sheet supply source to supply a sheet (a piece of paper) to the image former 22 one sheet at a time.

The sheet that has been sent from the sheet feeder 24 and subjected to image printing by the image former 22 is discharged to an output tray 26. In the present embodiment, the output tray 26 is provided in an in-body space between the image former 22 and the image reader 12.

Figure 2:
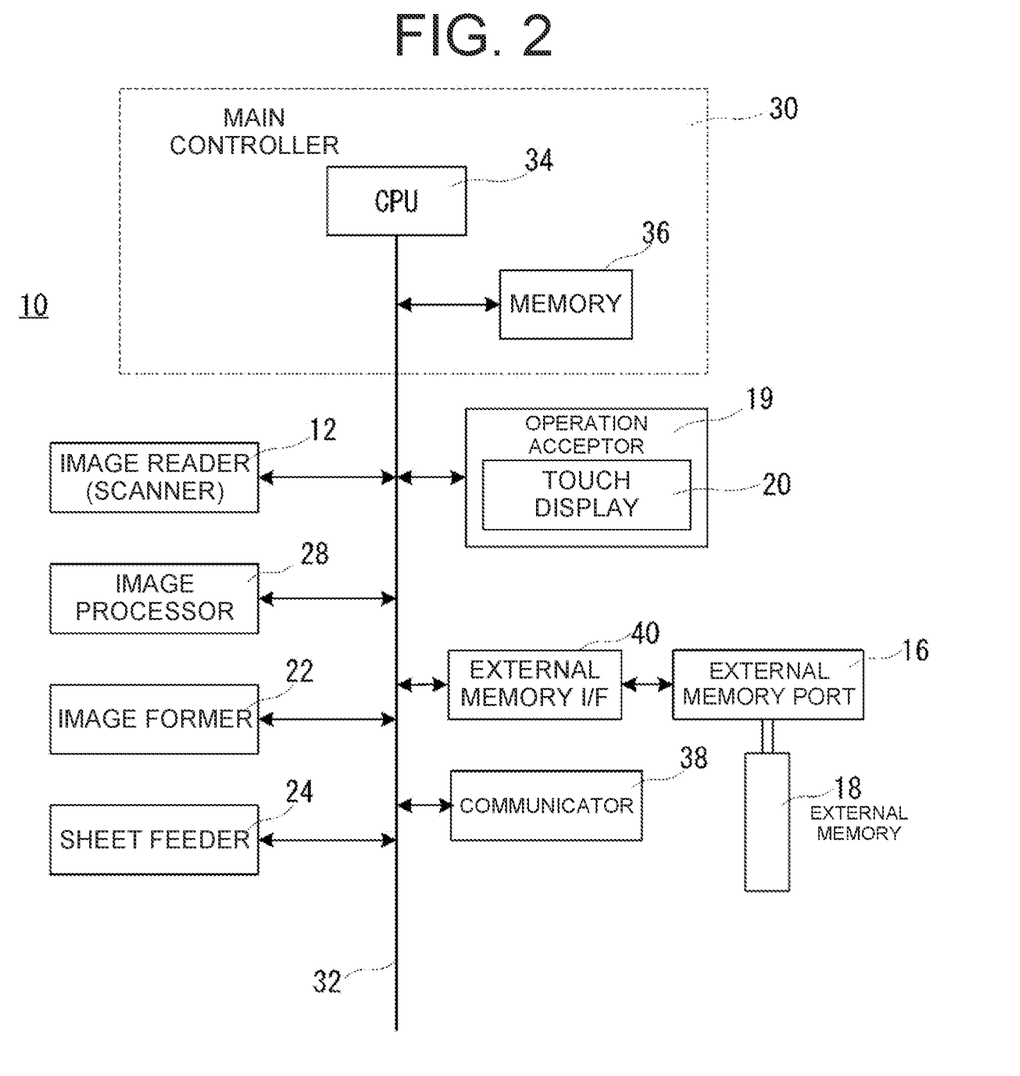
FIG. 2 is a block diagram illustrating an example of an electric configuration of the image forming apparatus according to the present embodiment.

With reference to FIG. 2, the image forming apparatus 10 further includes an image processor 28, a main controller (computer) 30, a communicator 38, an external memory interface ("external memory I/F") 40, and the like. These are connected to each other via a common bus 32.

The main controller 30 is essentially a computer and includes a CPU 34 and a memory 36. Although not illustrated in detail, the memory 36 includes RAM, ROM, a hard disk drive (HDD), and the like. The CPU 34 is connected to the bus 32, to which the RAM, the ROM, the HDD, and the like of the memory 36 are electrically connected. The CPU 34 executes various computer programs in response to instructions from the operation acceptor 19 and the like to execute operations of the various elements of the image forming apparatus 10. The various computer programs are stored in advance in the ROM or the HDD and are loaded into the RAM and executed as needed.

The communicator 38 controls data communication in accordance with a predetermined communication protocol between the image forming apparatus 10 and information processing devices and the like on a network via the network (not illustrated). Furthermore, the image forming apparatus 10 can receive, via the communicator 38, command signals commanding the execution of various processes such as print jobs from the information processing devices.

The communicator 38 further provides a connection to a public line (not illustrated) for fax communication.

The external memory I/F 40 reads and writes information (data) to the external memory 18, such as a USB flash drive, attached to the external memory port 16 (FIG. 1).

The bus 32 is further electrically connected to the image reader 12, the image processor 28, the image former 22, the operation acceptor 19, the sheet feeder 24, and other sections.

As described above, the image reader 12 reads image information from a document placed on a document table 14 (FIG. 1) and outputs it as image data to the image processor 28. The image reader 12 also detects the sheet size of the document placed on the document table 14 and outputs it to the main controller 30.

The image former 22 prints an image indicated by image data on a sheet, as described above, and is provided with photoconductor drums, charging devices, laser scanning units (LSU), developing devices, transfer devices, cleaning devices, fusing devices, and static eliminators, as well known.

Figure 3:
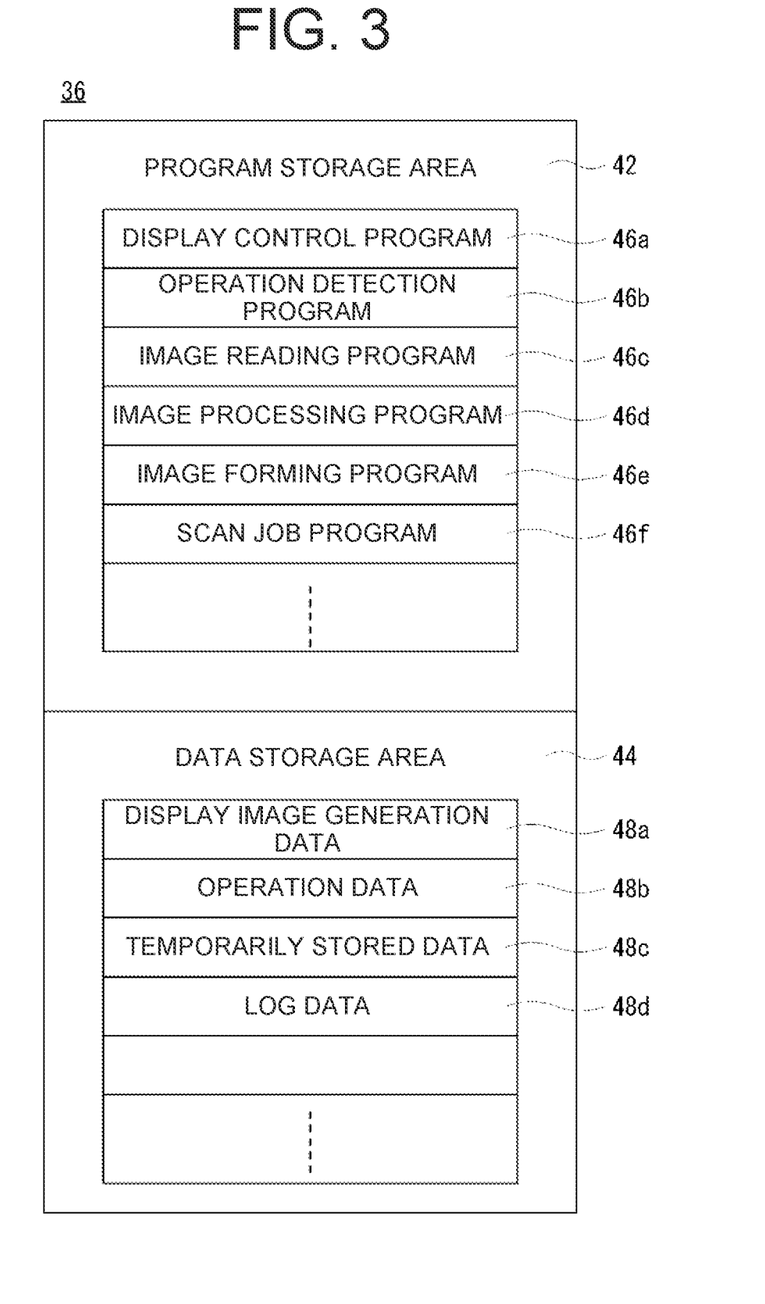
FIG. 3 is an illustrative diagram of an example of a memory map of a RAM according to the embodiment illustrated in FIG. 2.

FIG. 3 is an illustrative diagram of an example of a memory map of the RAM of the memory 36 according to the embodiment of FIG. 2. As illustrated in FIG. 3, the RAM includes a program storage area 42 and a data storage area 44. The program storage area 42 stores a control program of the image forming apparatus 10.

The control programs of the image forming apparatus 10 include a display control program 46a, an operation detection program 46b, an image reading program 46c, an image processing program 46d, an image forming program 46e, and a scan job program 46f.

The display control program 46a is a program that generates display screen data required for displaying various kinds of screens on a screen of the touch display 20 on the basis of display image generation data and the like in a display image generation data storage area 48a, which is described later, to display images on the touch display 20 using the display screen data.

The operation detection program 46b is a program that detects operation data corresponding to operations on the operation acceptor 19 to store the operation data in an operation data storage area 48b, which is described later. For example, when a touch panel (not illustrated) is touched, the main controller (computer) 30 acquires as operation data touch coordinate data output from the touch panel in accordance with the operation detection program 46b and stores the data in the operation data storage area 48b. When a hardware button or a key (not illustrated) of the operation acceptor 19 is pressed or operated, the main controller 30 acquires operation data due to pressing or operating the hardware button or the key in accordance with the operation detection program 46b and stores the operation data in the operation data storage area 48b.

The image reading program 46c controls an automatic document feeder (not illustrated) and the image reader (scanner) 12 to read a document placed on a document loading tray or the document table 14 and stores data of the read document image in a temporary storage area 48c.

The image processing program 46d mainly executes preprocessing for image formation by the image former 22 such as a crop processing for image data read in accordance with the image reading program 46c.

The image forming program 46e is a program that controls the image former 22 to print image data on a recording sheet supplied from the sheet feeder 24.

The scan job program 46f is a program that controls a job (also referred to as "scan job" in this specification) for directly saving image data (scan data) read by the image reader (also referred to as "scanner" in this specification) 12 of the image forming apparatus 10 in an external memory 18 (FIG. 2) such as a USB flash drive, as in ScanToUSB, for example.

Although not illustrated, the program storage area 42 also stores other programs required for controlling the image forming apparatus 10.

The data storage area 44 has therein the display image generation data storage area 48a, the operation data storage area 48b, the temporary storage area 48c, a log data area 48d, and the like.

Display image generation data in the display image generation data storage area 48a includes polygon data, texture data, and the like for generating display images. The display image generation data includes image data corresponding to software keys and image generation data for displaying various screens.

Operation data in the operation data storage area 48b is operation data detected in accordance with the operation detection program 46b and is stored in chronological order. The operation data is deleted after being used in processing performed by the main controller 30.

The temporary storage area 48c temporarily stores image data read by the image reader 12 and the like, for example, for image processing of the image processing program 46d.

The log data area 48d stores data (log) that associates (correlates) the identification information of the external memory 18 and the identification information of the job when the above scan job is executed in accordance with the scan job program 46f.

The data storage area 44 not only stores other data required for execution of the control programs of the image forming apparatus 10 but also includes flags and counters (timers) required for executing the control programs.

Figure 4:
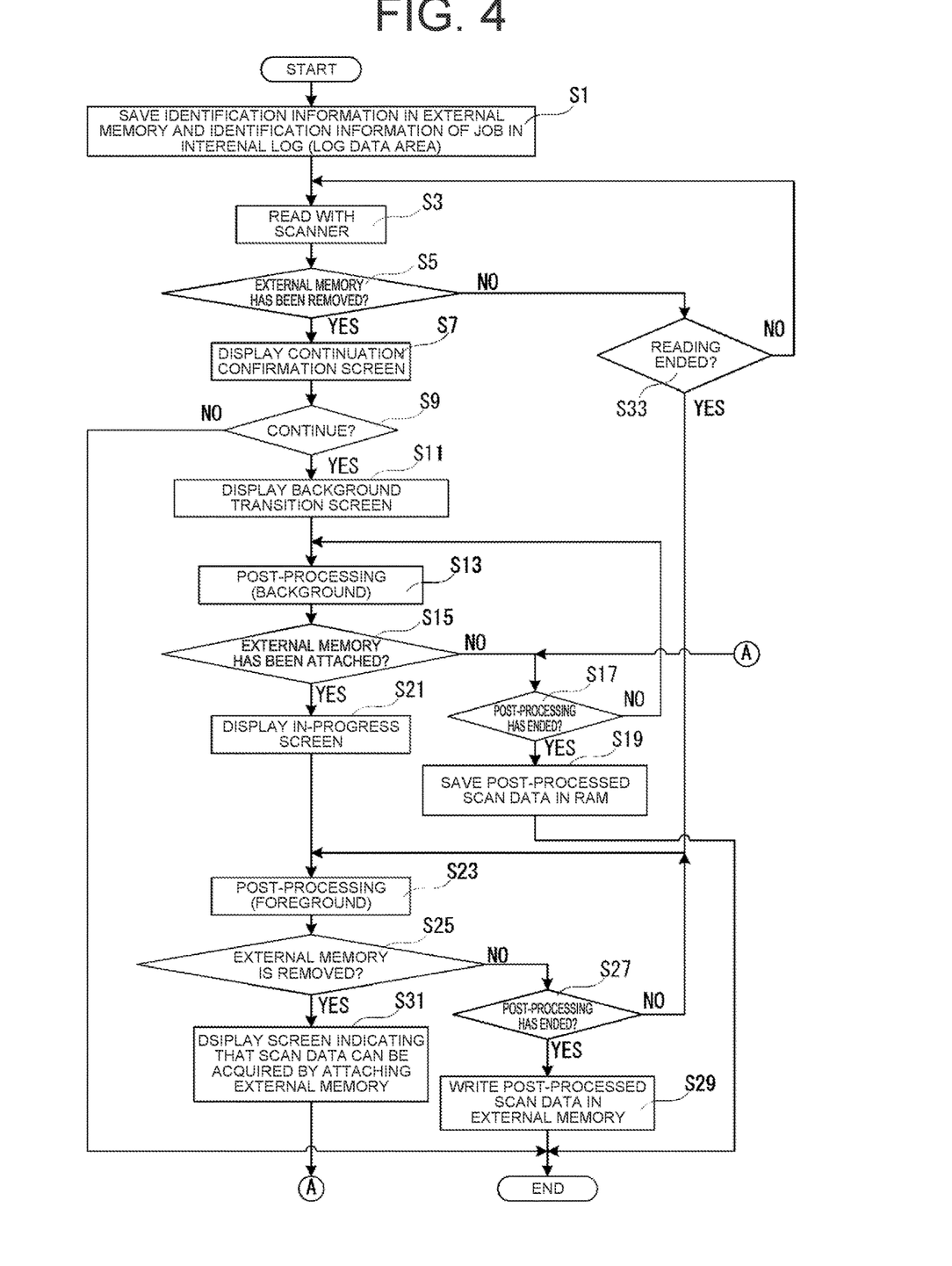
FIG. 4 is a flow diagram of an example of an operation of a main controller (CPU) when writing image data to a USB flash drive in an embodiment.

With reference to FIG. 4, the operation of the present embodiment executed primarily in accordance with the scan job program 46f and the like is described.

The operation of FIG. 4 is started by setting a document for which image data (scan data) is to be acquired by a scan job to the document table 13 or an automatic document feeder (not illustrated) provided on the document table cover 14 and attaching an external memory (here, a USB flash drive) 18 to the external memory port 16 (FIG. 1).

In step S1 of FIG. 4, the main controller or computer 30 (FIG. 2) records the identification information of the external memory 18 (device specific information) and the identification information of a scan job (e.g., a file number attached to each date) in association with each other in the log data area 48d.

Next, in step S3, the scanner 12 starts reading the document, and the obtained scan data (image data) is stored in the temporary storage area 48c together with the identification information of the scan job.

As identification information of the external memory 18, there are a vendor ID representing the manufacturer of the USB flash drive, a product ID representing the type of product, and a character string indicating a serial number (called "iSerialNumber") that is a unique number of an individual product, which can be acquired from Windows Management Instrumentation (WMI), and in step S1, all or some of these are recorded in a log as identification information of the external memory 18.

In step S5, the computer 30 determines whether or not the external memory 18 has been removed from the external memory port 16, for example, on the basis of a signal from the external memory I/F 40.

Figure 5:
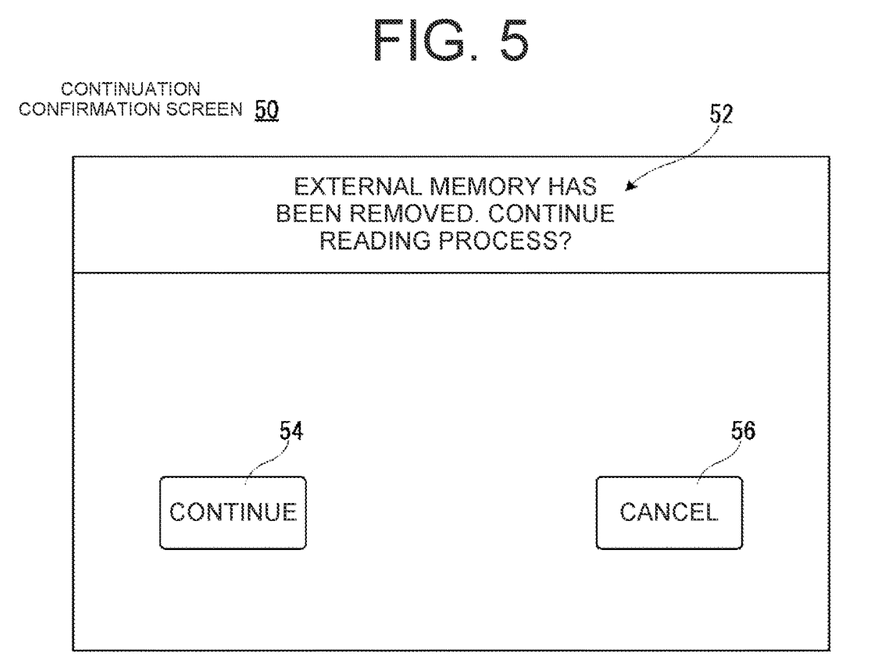
FIG. 5 is an illustrative diagram of an example of a job continuation confirmation screen when the USB flash drive is removed in the middle of a job in an embodiment.

When "YES" is determined in step S5, that is, when it is determined that the external memory 18 has been removed from the external memory port 16, the computer 30 displays a continuation confirmation screen 50 illustrated in FIG. 5 on the display 20 (FIG. 1) in step S7.

In the continuation confirmation screen 50, a message asking the user to confirm whether to continue the scan job, for example, "The USB flash drive has been removed. Do you want to continue with the reading process?" is displayed in a message field 52, and a continuation instruction button 54 and a cancel button 56 are displayed as software keys. Thus, the user operates (touches) either button to decide whether to continue the scan job.

When "NO" is determined in step S9 for the continuation confirmation screen 50, that is, when the cancel button 56 is operated, the scan job is terminated as is. Thus, the user can remove the external memory and cancel the scan job at their will.

Figure 6:
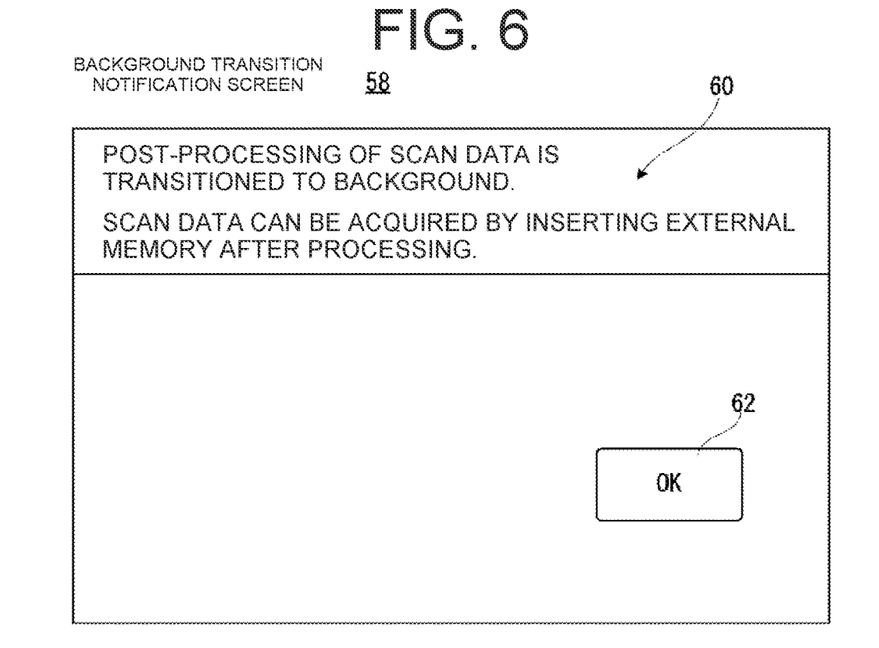
FIG. 6 is an illustrative diagram of an example of a background transition notification screen that announces that post-processing is shifted to the background in the embodiment.

When "YES" is determined in step S9, that is, when the user chooses to continue the scan job, the computer 30 switches that scan job to background processing in order to continue the scan job with the external memory 18 removed. The computer 30 then displays a background transition notification screen 58 on the display 20, as illustrated in FIG. 6.

The background transition notification screen 58 is a screen that announces the scan job is to be continued in the background because the external memory 18 has been removed, and a message "Post-processing of scan data is shifted to background. Scan data can be acquired after processing is complete by inserting USB flash drive." is displayed, for example, in a message field 60 to announce that the scan job instructed by the user is being continued. The user only needs to operate an OK button 62 on the background transition notification screen 58.

Next, in step S13, post-processing is executed in the background. The post-processing is assumed to be relatively time-consuming OCR processing, highly compressed PDF conversion processing (separating images into text information and background images), and virus scanning processing, and the like, as in step S23 explained below.

In step S15, the computer 30 determines whether or not the external memory 18 has been attached to the external memory port 16, for example, on the basis of a signal from the external memory I/F 40. At this time, the computer 30 compares the identification information of the attached external memory with the identification information of the external memory recorded as a log in step S1 and determines "YES" when the two match. That is, step S15 determines whether the same external memory that was removed in step S5 has been attached. Therefore, even if an external memory with different identification information is operated, "NO" is determined in step S15.

When "NO" is determined in step S15, that is, when the external memory 18 is not reattached to the external memory port 16, the post-processing in step S13 is continued until "YES" is determined in step S17, that is, until the end of post-processing is detected, and when "YES" is determined in step S17, the post-processed scan data (image data) is saved in the temporary storage area 48c of the RAM in step S19. The scan job then ends. That is, in this case, the scan job ends with the external memory 18 removed in the middle of the job.

In this case, however, the scan data file is stored with the identification information of the scan job set in step S1.

Figure 7:
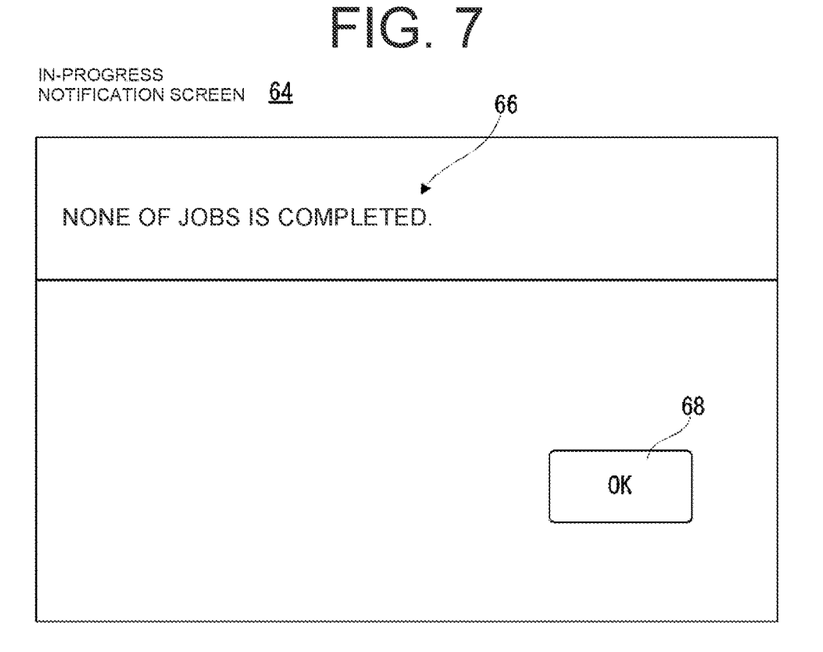
FIG. 7 is an illustrative diagram of an example of an in-process notification screen that announces that a job has not yet been completed in the embodiment.

Meanwhile, when "YES" is determined in step S15, that is, when the external memory 18 is reattached, an in-process notification screen 64 illustrated in FIG. 7 is displayed in step S21.

The in-process notification screen 64 is a screen for informing the user that the scan job is not completed and displays, for example, a message "No job is completed" is displayed in the message field 66. The user only needs to operate an OK button 68 on the in-process notification screen 64. Accordingly, at this point in step S21, the scan job has not yet been completed and the scan job is still being executed.

Figure 8:
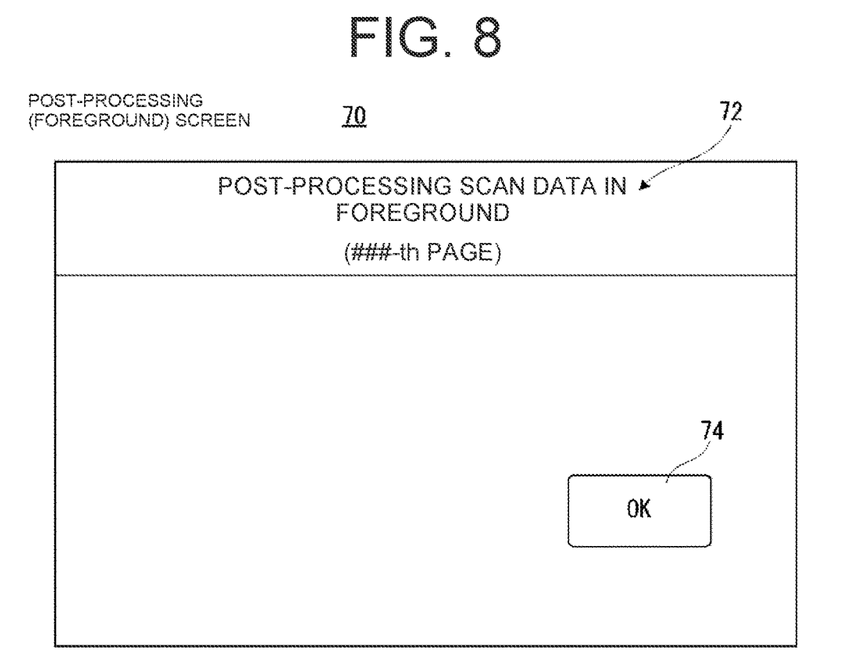
FIG. 8 is an illustrative diagram of an example of a foreground transition notification screen that announces that post-processing is executed in the foreground in the embodiment.

Next, in step S23, the computer 30 executes post-processing in the foreground and displays a post-processing (foreground) screen 70 illustrated in FIG. 8. This is because the external memory 18 is reinserted in step S15 and does not need to be processed in the background since the user is present in the vicinity of the image forming apparatus 10.

The post-processing (foreground) screen 70 informs the user that post-processing of the scan data is being executed in the foreground. That is, the post-processing (foreground) screen 70 includes a message area 72 displaying, for example, a message "Scanning data is being post-processed in foreground (###-th page)" to inform the user that post-processing is currently being executed in the foreground on the ###-th page. The user only needs to operate an OK button 74 on the post-processing (foreground) screen 70.

Next, in step S25, the computer 30 again determines whether the external memory 18 is removed.

When "NO" is determined in step S25, that is, when it is determined that the external memory 18 is not removed, step S27 determines whether the post-processing in step S23 has been completed. That is, the post-processing in step S23 continues until "YES" is determined in step S27.

When "YES" is determined in step S27, in step S29, the computer 30 writes the post-processed scan data to the external memory 18 attached to the image forming apparatus 10 at that time, and the scan job ends. That is, when a scan job is completed after it is detected that the external memory 18 has been once removed in step S5 and reattached in step S15, that is, when "YES" is determined in step S27, the scan data can be saved as is in the reattached external memory 18 in step S29.

Figure 9:
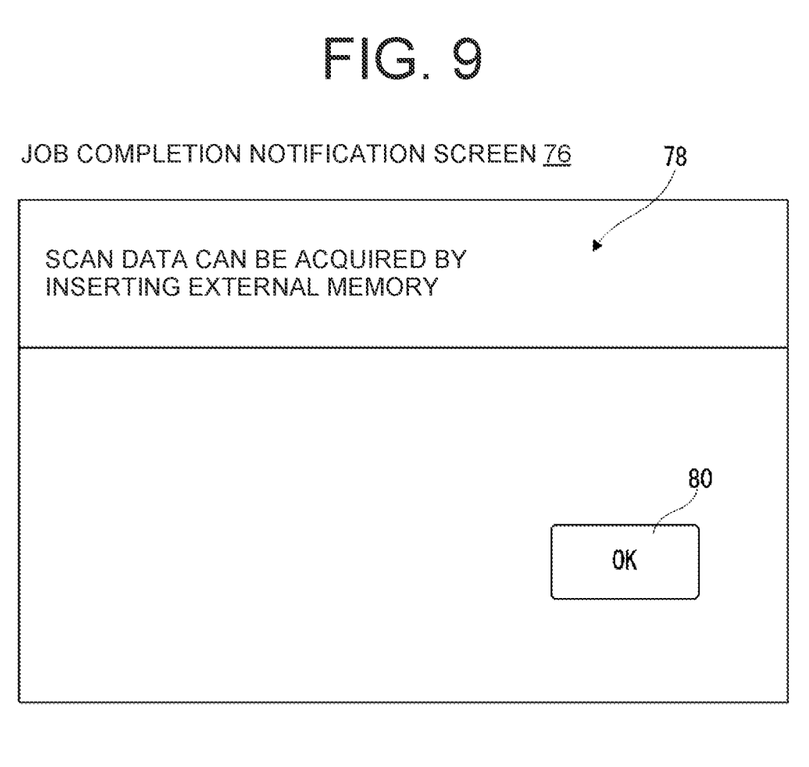
FIG. 9 is an illustrative diagram of an example of a job completion notification screen that announces that a job has been completed in the embodiment.

When "YES" is determined in step S25, that is, when the external memory 18 is removed, the job completion notification screen 76 illustrated in FIG. 9 is displayed in step S31.

The job completion notification screen 76 includes a message area 78 displaying, for example, a message "Scan data can be acquired by inserting USB flash drive." to inform the user that the scan job has been completed and scan data can be saved in the USB flash drive by inserting the USB flash drive. The user only needs to operate an OK button 80 on the job completion notification screen 76.

After step S31, the process returns to step S17 to determine whether or not background post-processing has been completed. Therefore, with the external memory 18 removed, the scan job ends in step S19 with the post-processed scan data (image data) saved in the temporary storage area 48c of the RAM. That is, also, in this case, the scan job ends with the external memory 18 removed in the middle of the job.

When "NO" is determined in step S5, that is, when it is determined that the external memory 18 has not been removed from the external memory port 16, the computer 30 saves the scan data in the attached external memory 18 in step S33. That is, if the external memory 18 is not removed until the end of the scan job, the scan data is saved in the external memory 18.

In contrast, if the post-processed scan data is saved in the temporary storage area 48c of the RAM, and the scan job ends in step S19, the scan data is not yet saved in the external memory 18. Accordingly, the external memory 18 is attached and the scan data is written to the external memory 18 in accordance with FIG. 10.

Figure 10:
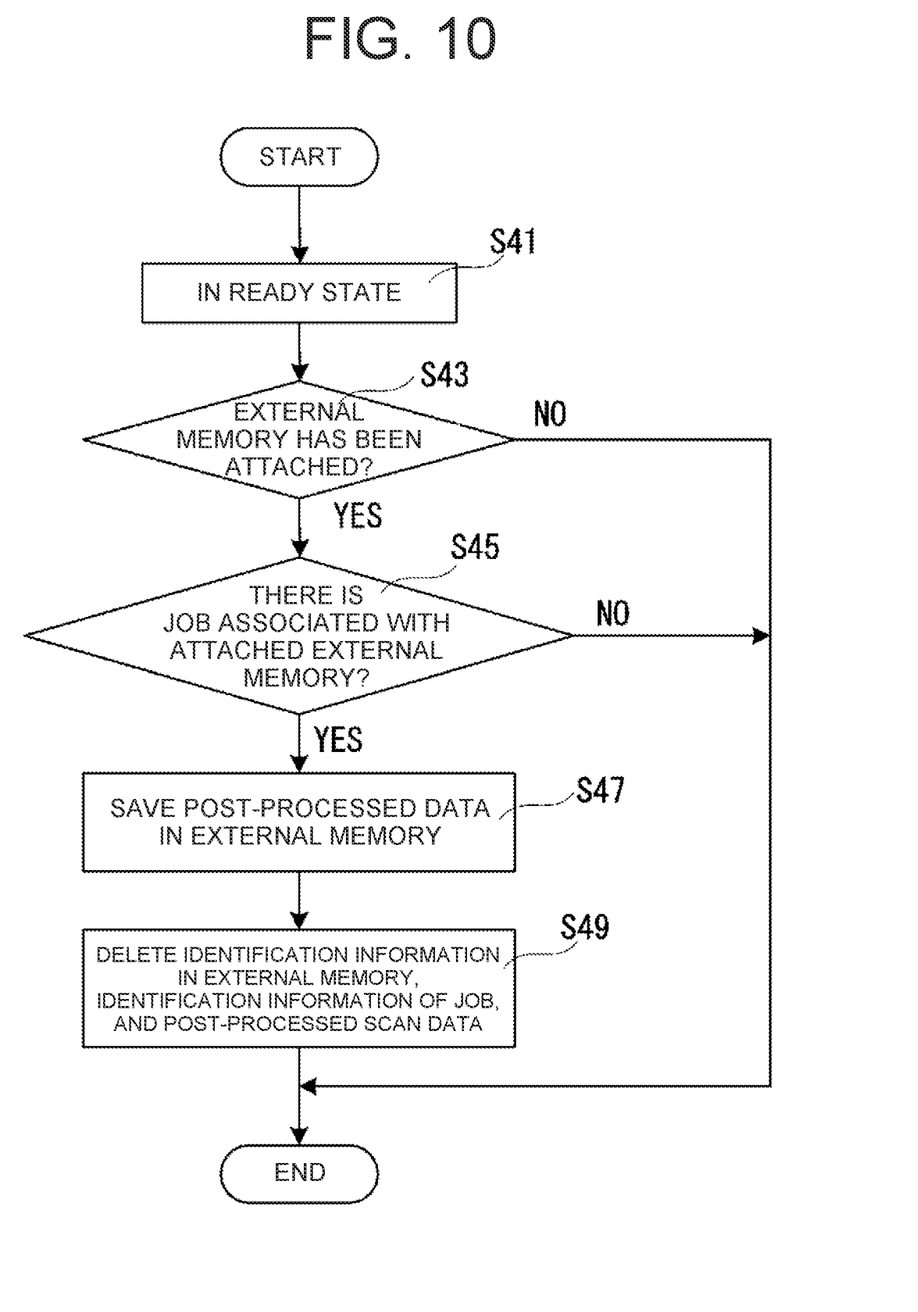
FIG. 10 is a flow diagram of an example of an operation of a main controller (CPU) when writing image data to a USB flash drive removed in the middle of a job in an embodiment.

When the image forming apparatus 10 is in a ready state in step S41 of FIG. 10, that is, when the image forming apparatus 10 is in a waiting state, the computer 30 determines in step S43 whether the external memory 18 has been attached to the external memory port 16, for example, on the basis of signals from the external memory I/F 40.

When "YES" is determined in step S43, step S45 determines whether a scan job associated with the external memory 18 whose attachment was detected in step S43 is saved in the temporary storage area 48c of the RAM. That is, since, in step S1 of FIG. 4, the unique identification information of the external memory 18 and the identification information of the scan job to be executed are recorded in the log data area 48d of the RAM of the memory 36 of the computer 30 at the start of the scan job, in step S45, the computer 30 reads the identification information of the external memory 18 detected in step S43 on the basis of the log recording and determines whether there is scan data with the identification information corresponding to the read identification information.

When "YES" is determined in step S45, that is, when there is corresponding scan data in the attached external memory 18, the computer 30 writes and saves the scan data to the external memory 18 in step S47.

Next, in step S49, the computer 30 deletes the identification information of the external memory 18, the identification information of the job, and the scan data temporarily saved in temporary storage area 48c. The process then ends.

However, if step S43 or S45 determines "NO," the operation in FIG. 10 ends.

The specific configuration and the like given in the above-described embodiment are examples, and can be appropriately changed according to the actual product. Furthermore, the processing order of steps in the flow chart illustrated in the above embodiment can be changed as needed, as long as equivalent results are obtained.

What is claimed is:

1. An image forming apparatus that executes a scan job to save scan data scanned by a scanner in an external memory, the apparatus comprising:
the scanner that scans a document;
an external memory port to which the external memory is removably attached;
a log data storage that stores identification information of the external memory attached to the external memory port and identification information of the scan job as a log by associating the identification information of the external memory with the identification information of the scan job;
first determiner determining circuitry that determines whether the external memory is removed from the external memory port during execution of the scan job;
displaying circuitry that display a continuation confirmation screen that receives a selection by a user on whether to continue or cancel the scan job when the first determining circuitry determines that the external memory has been removed;
a temporary storage that temporarily stores the scan data together with the identification information of the scan job when continuation of the scan job is selected on the continuation confirmation screen by the user, wherein the execution of the scan job continues when the continuation of the scan job is selected on the continuation confirmation screen;

second determining circuitry that determines whether the scan data associated with the external memory is saved in the temporary storage when the external memory is reattached to the external memory port; and storing circuitry that stores, in the external memory, the scan data stored in the temporary storage when the second determining circuitry determines that the associated scan data is saved in the temporary storage and the external memory has been reattached to the external memory port.

2. The image forming apparatus according to claim 1, wherein the scan job ends when the continuation of the scan job is not selected by the user on the continuation confirmation screen.

3. The image forming apparatus according to claim 1, wherein the storing circuitry further saves the scan data in the external memory when the first determining circuitry do not determine that the external memory has been removed.

4. The image forming apparatus according to claim 1, further comprising:

third determining circuitry that determines whether the removed external memory has been reattached to the external memory port before the scan job is completed, wherein the storing circuitry further saves the scan data in the reattached external memory when the third determining circuitry determines that the external memory has been reattached.

5. A non-transitory recording medium storing therein a control program of an image forming apparatus that executes a scan job to save scan data scanned by a scanner in an external memory, the apparatus comprising the scanner that scans a document and an external memory port to which the external memory is removably attached, the control program causing a computer of the image forming apparatus to function as:

a log data storage that stores identification information of the external memory attached to the external memory port and identification information of the scan job as a log by associating the identification information of the external memory with the identification information of the scan job;

first determining circuitry that determines whether the external memory is removed from the external memory port during execution of the scan job;

displaying circuitry that display a continuation confirmation screen that receives a selection by a user on whether to continue or cancel the scan job when the first determining circuitry determines that the external memory has been removed;

a temporary storage that temporarily saves the scan data together with the identification information of the scan job when continuation of the scan job is selected on the continuation confirmation screen by the user, wherein the execution of the scan job continues when the continuation of the scan job is selected on the continuation confirmation screen;

second determining circuitry that determines whether the scan data associated with the external memory is saved in the temporary storage when the external memory is reattached to the external memory port; and storing circuitry that stores, in the external memory, the scan data stored in the temporary storage when the second determining circuitry determines that the associated scan data is saved in the temporary storage and the external memory has been reattached to the external memory port.

6. A control method of an image forming apparatus that executes a scan job to save scan data scanned by a scanner in an external memory, the apparatus comprising the scanner that scans a document and an external memory port to which the external memory is removably attached, the method comprising:

storing identification information of the external memory attached to the external memory port and identification information of the scan job as a log by associating the identification information of the external memory with the identification information of the scan job;

determining whether the external memory is removed from the external memory port during execution of the scan job;

displaying a continuation confirmation screen that receives a selection by a user on whether to continue or cancel the scan job when determining that the external memory has been removed;

temporarily storing the scan data together with the identification information of the scan job when continuation of the scan job is selected on the continuation confirmation screen by the user, wherein the execution of the scan job continues when the continuation of the scan job is selected on the continuation confirmation screen;

determining whether the scan data associated with the external memory is saved in the temporarily storing when the external memory is reattached to the external memory port; and storing, in the external memory, the scan data stored in the temporarily storing when determine that the associated scan data is saved in the temporarily storing and the external memory has been reattached to the external memory port.

* * * * *